US007781902B2

(12) United States Patent
Cerney et al.

(10) Patent No.: US 7,781,902 B2
(45) Date of Patent: Aug. 24, 2010

(54) GENERATOR SYSTEMS AND METHODS

(75) Inventors: Dennis John Cerney, Mukwonago, WI (US); David Paul Serdynski, Waukesha, WI (US); John Gordon Marx, Hartford, WI (US); Jonathan Zick, Waukesha, WI (US); Andrew G. Gongola, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 550 days.

(21) Appl. No.: 11/670,747

(22) Filed: Feb. 2, 2007

(65) Prior Publication Data

US 2007/0182158 A1 Aug. 9, 2007

Related U.S. Application Data

(60) Provisional application No. 60/764,707, filed on Feb. 2, 2006.

(51) Int. Cl.
*F02D 29/06* (2006.01)
*H02P 9/04* (2006.01)
*H02K 7/18* (2006.01)

(52) U.S. Cl. ...................................... 290/40 F; 290/1 A

(58) Field of Classification Search ................. 290/1 A, 290/40 F, 40 C; 320/107, 105; 322/14; 307/46
See application file for complete search history.

(56) References Cited

U.S. PATENT DOCUMENTS 3,767,995 A * 10/1973 Kaminski et al. ........... 320/125
5,296,799 A * 3/1994 Davis .......................... 322/35
5,543,702 A * 8/1996 Pfeiffer ...................... 320/110
6,624,533 B1 * 9/2003 Swanson et al. .............. 307/64
6,696,675 B2 * 2/2004 Morrison .................... 219/661
6,998,728 B2 * 2/2006 Gupta et al. .................. 290/52
7,095,126 B2 * 8/2006 McQueen ................... 290/1 A
7,119,450 B2 * 10/2006 Albrecht ..................... 290/1 A
7,432,613 B2 10/2008 Jabaji et al.
2003/0111461 A1 6/2003 Morrison
2004/0263119 A1 * 12/2004 Meyer et al. ................ 320/116
2006/0131885 A1 * 6/2006 Wurtele ...................... 290/1 A

FOREIGN PATENT DOCUMENTS

EP 0698522 2/1996
JP 59153955 A * 9/1984
JP 2004336833 A 11/2004
WO 0111765 A1 2/2001
WO 2005/119877 12/2005

* cited by examiner

*Primary Examiner*—Julio Gonzalez
(74) *Attorney, Agent, or Firm*—Michael Best & Friedrich LLP

(57) ABSTRACT

A generator set. In one embodiment, the generator set includes an internal combustion engine, a DC generator, one or more battery cells, and an inverter. The DC generator is coupled to the engine and produces direct current ("DC") electricity. The battery cells discharge stored DC electricity and can be recharged using DC electricity from the DC generator. The inverter is electrically connected to the DC generator and to the battery cells. The inverter converts DC electricity produced by the DC generator and DC electricity discharged from the one or more battery cells to alternating current ("AC") electricity. The AC electricity is available for use by a load.

9 Claims, 4 Drawing Sheets

GENERATOR SYSTEMS AND METHODS

RELATED APPLICATION

This application claims priority to U.S. Provisional Application No. 60/764,707, filed Feb. 2, 2006, the entire contents of which are incorporated herein by reference.

FIELD

The invention relates to electrical generators. More specifically, some embodiments of the invention relate to generators that provide power to a load from multiple sources. Other embodiments of the invention relate to electrical generator systems that include an additional integrated device.

BACKGROUND

Electrical generator sets supply electrical power in remote locations or in locations where access to standard utility power is unavailable. Generator sets can also provide a source of back-up energy in the event of a utility power failure. Some generator sets are sized such that they can be moved from one place to another. Such portable generator sets generally consist of an internal combustion engine coupled to a synchronous alternator or a direct-current ("DC") generator.

Traditionally, the engine of a generator set has to operate at a constant speed, regardless of the load, to provide a usable source of power. The constant operation of the engine can cause extra noise to be generated and fuel to be used, even when the actual usage of power from the generator set is light (or even unloaded).

SUMMARY

In one embodiment, a generator set includes an internal combustion engine, a DC generator, one or more battery cells, and an inverter. The DC generator is coupled to the engine and produces direct current ("DC") electricity. The one or more battery cells discharge stored DC electricity and can be recharged using DC electricity from the DC generator. The inverter is electrically connected to the DC generator and to the one or more battery cells. The inverter converts DC electricity produced by the DC generator and DC electricity discharged from the one or more battery cells to alternating current ("AC") electricity. The AC electricity is available for use by a load.

In another embodiment, a generator set includes an internal combustion engine, a DC generator, one or more battery cells, a battery charger, and an inverter. The DC generator is coupled to the engine and produces direct current ("DC") electricity. The one or more battery cells discharge stored DC electricity and can be recharged using DC electricity from the DC generator. The battery charger also recharges the one or more battery cells and is powered by an external power supply. The inverter is electrically connected to the DC generator and to the one or more battery cells. The inverter converts DC electricity produced by the DC generator and DC electricity discharged from the one or more battery cells to alternating current ("AC") electricity. The AC electricity is available for use by a load.

In yet another embodiment, a generator set includes an internal combustion engine, an alternator that is coupled to the engine for producing electricity, and a pump that is coupled to the engine for compressing a liquid or a gas.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Some embodiments of the invention generally relate to generator sets that provide power to a load from multiple sources. In an embodiment, a generator set includes an engine and one or more batteries, each of which can provide a separate source of energy for a load. The engine can also be used to charge the batteries, so that the batteries can provide power to the load without the engine operating. As such, embodiments disclosed herein can reduce the amount of noise that is produced by a typical generator by reducing the duration that the engine of the generator operates (as described below). Additionally, operating the engine for a relatively shorter duration can increase efficiencies, reduce fuel consumption, and reduce pollution created from burning engine fuel.

Figure 1:
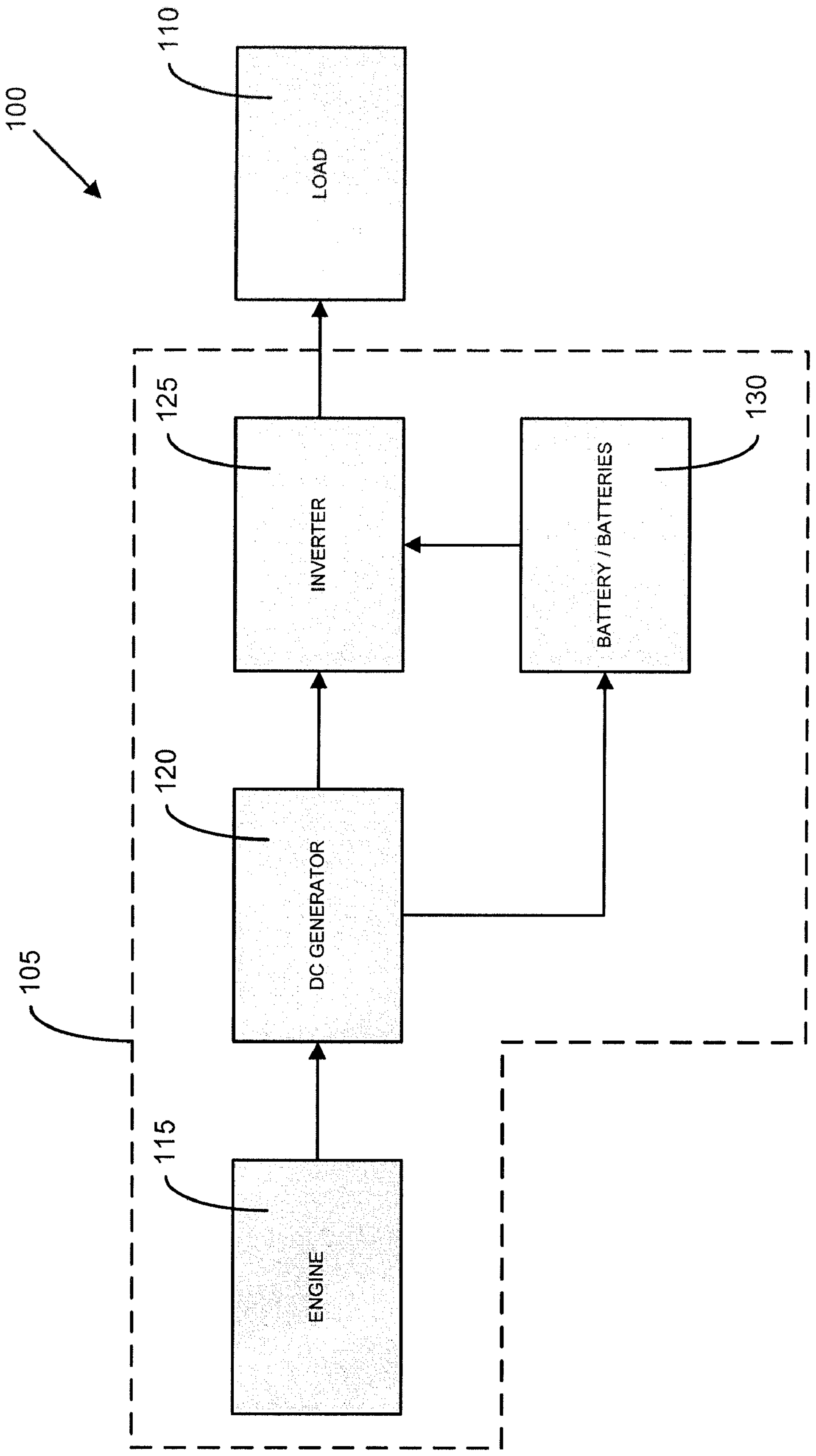
FIG. 1 is a block diagram of a system that includes an exemplary hybrid generator.

FIG. 1 is a block diagram of a system 100 that includes a generator set 105 and a load 110. The generator set 105 shown in FIG. 1 generally includes an engine 115, a DC generator or an alternator/rectifier 120, an inverter 125, and one or more batteries 130. In other embodiments, the generator set 105 may be configured differently. For example, in one embodiment, the one or more batteries 130 can be positioned external to the generator set 105.

The size and capacity of the engine 115 is variable, and depends on the size of the anticipated load 110. A relatively large load 110 may require a relatively large engine. Likewise, a smaller load 110 requires a relatively smaller engine. Additionally, the size of the engine 115 can depend on the desired mobility of the generator set 105. For example, the engine 115 may be an internal combustion engine sized such that the generator set 105 can be easily moved from one location to another (i.e. a portable generator set). In one exemplary embodiment, the engine 115 is a 2.4 horsepower ("hp") engine that produces an output power of 3000 watts. Other engine sizes are also possible (e.g., a 6 hp engine). In some embodiments, the engine 115 is designed to operate at a single speed (e.g., 3600 revolutions per minute ("RPM")).

The DC generator 120 uses the mechanical motion provided by the engine 115 to produce DC electricity. Such generators are generally known in the art. The output of the DC generator 120 is at least partially dependent on the size and the operation of the engine 115. In some embodiments, the DC generator is implemented as an alternating-current ("AC") alternator and rectifier combination.

In some embodiments, the inverter 125 converts DC electricity to a 60 hertz ("Hz") 120 volt AC source. In other embodiments, the inverter may provide a source of a different frequency and/or an alternative voltage. For example, the inverter 125 may convert DC electricity to a 50 hertz signal and/or a 240 volt AC voltage source.

The batteries 130 can have a variety of different voltage ratings as well as a variety of different chemical make-ups. Additionally, the batteries 130 can be a variety of different styles. For example, in one embodiment, the batteries 130 are 18 volt nickel cadmium rechargeable battery packs. However, in other embodiments, the batteries 130 can have other voltage ratings (e.g., 12 volt, 24 volt, 28 volt, etc.), be other chemical make-ups (e.g., lead acid, nickel metal hydride, lithium ion, and the like), or be other styles (e.g., heavy duty, starting, or dual purpose). The batteries 130 can also comprise a combination of batteries having any of the ratings, chemical make-ups, and styles described above, as well as other ratings, chemical make-ups, and styles not specifically described herein. In one embodiment, the batteries 130 are integrated into or housed within the generator set 105. In other embodiments, the batteries 130 may be modular units that can be added to and removed from the generator set 105 (e.g., rechargeable cordless power tool battery packs). The batteries 130 store and discharge a large amount of power. This power can be used to provide power to the load 110, as well as start large loads, as described in greater detail below.

During use, the engine 115 provides the mechanical force needed to drive the generator 120. The DC generator 120 provides a DC voltage to the inverter 125, which converts the DC voltage to a 120 or 240 volt source (as previously described) that can be used to power the load 110. In some embodiments, circuitry can also be included that allows a DC load 110 to receive power from the DC generator 120 directly. The DC generator 120 also provides a DC voltage to the batteries 130, which charges the batteries 130 until they reach a certain capacity. Once the batteries 130 are at least partially charged, the batteries 130 can provide a DC voltage to the inverter 125, which converts the DC voltage to power the load 105. The batteries 130 can also have a preexisting charge.

In one embodiment, the DC generator 120 provides only as much voltage to the inverter 125 as is needed to satisfy the load 110, and routes any remaining voltage to the batteries 130 to charge them (if the batteries 130 are not already charged). The engine 115 and generator 120 continue to run until the batteries 130 are fully charged, or are charged to another predefined state. When the batteries 130 reach a fully charged or other predefined state (e.g., 90% of full capacity), the engine 115 can shut down regardless of the load 110. The inverter 125 then supplies power to the load 110 from the batteries 130 only. Power to the load 110 is not significantly interrupted during this transition. With relatively light loads 110, the batteries 130 will have the ability to provide power for a relatively longer time than with heavier loads 110. In some embodiments, circuitry is included in the generator set 105 that balances the power draw from each battery 130. After the batteries 130 have been discharged to a predetermined state (e.g., 5% of full capacity), the engine 115 can be restarted to power the load 110 and recharge the batteries 130. The state of the one or more batteries (i.e., how much of the battery charge remains) is determined, at least in one embodiment, by circuitry included in the inverter 125. In other embodiments, the state of the batteries can be determined by another mechanism or circuitry (e.g., a monitor integrated directly into the batteries 130).

In an alternative embodiment, the DC generator 120 does not supply voltage to the inverter 125, and routes all of the voltage to the batteries 130 to charge them. The engine 115 continues to operate until the batteries 130 reach a predetermined charge level (e.g., full capacity, 95% capacity, etc.). Upon sufficient charge of the batteries 130, the engine 115 shuts down. In this alternative embodiment, the DC voltage is supplied to the inverter 125 by the batteries 130 only.

The batteries 130 can store and discharge a large amount of power. This power can be used, for example, to start the engine 115 of the generator 105, or provide a large amount of power for one or more devices electrically connected to the generator 105. Occasionally, loads (i.e., the engine 115 and the load 110) require a large amount of instantaneous power, also known as a power surge. The "surge rating" or amount of instantaneous power that a generator set can support is sometimes limited by the amount of power that can be instantaneously produced by the engine. However, in some embodiments of the present invention, the surge rating is dictated by the size and/or capabilities of the batteries 130 and the inverter 125. As such, a relatively higher surge rating may be gained by a generator (such as the generator 115) that includes an inverter 125 and one or more batteries 130, than a generator that does not include batteries and an inverter.

Figure 2:
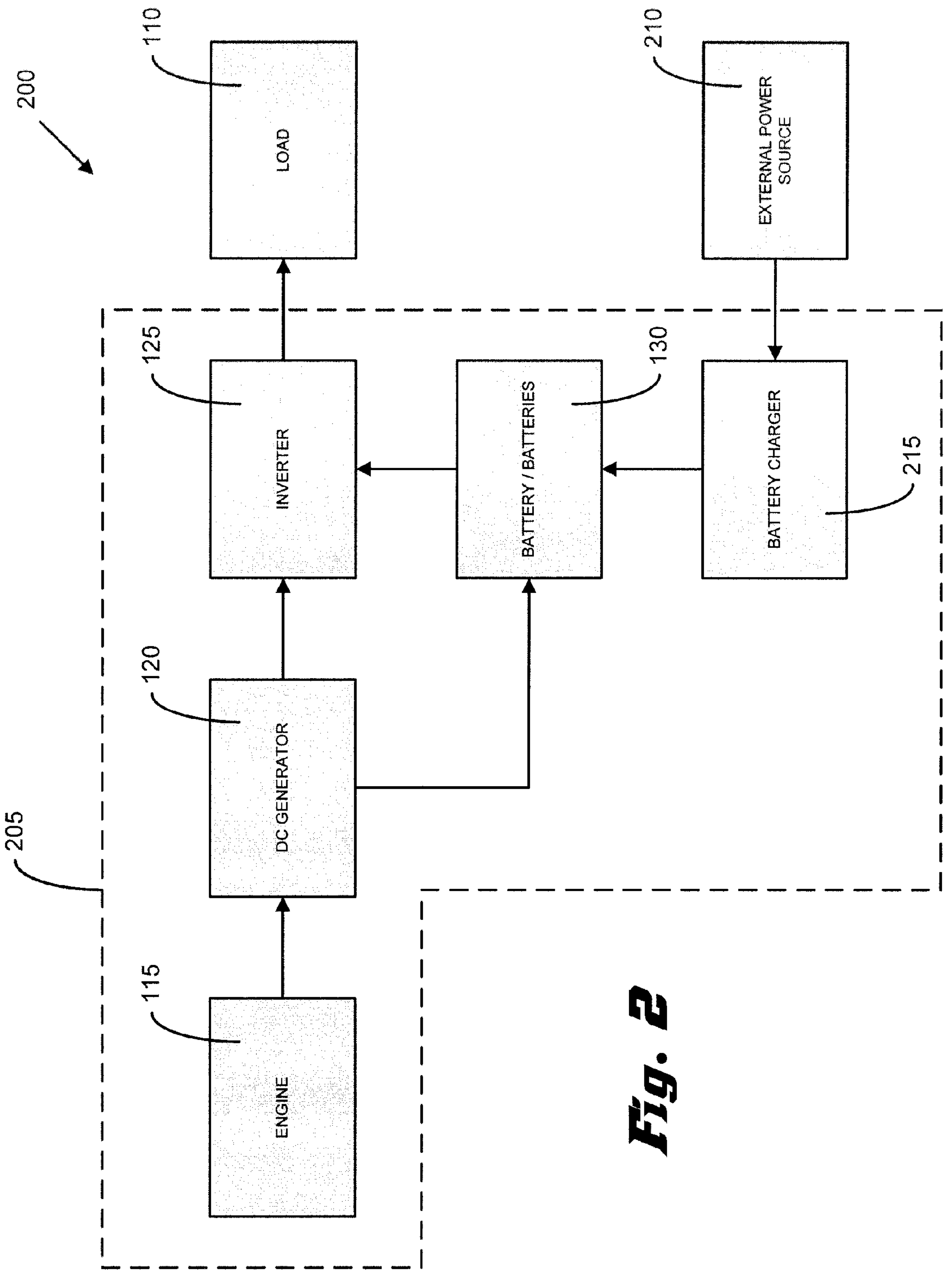
FIG. 2 is a block diagram of a second system that includes an exemplary hybrid generator.

FIG. 2 illustrates a second system 200 that includes a generator set 205, an external power supply or source 210, and the load 110. The generator set 205 includes the engine 115, the DC generator 120, the inverter 125, the batteries 130, as well as a battery charger 215.

The generator set 205 is configured similar to the generator set 105. The addition of the external power source 210 and the battery charger 215 allow, among other things, the batteries 130 of the generator set 205 to be charged without operating the engine 115 or the generator 120. The external power source 210 provides power to the battery charger 215, which charges the batteries 130. For example, a contractor or other laborer utilizing the generator set 205 on a jobsite can provide the external power source 210 (e.g., plug the battery charger 215 into an electrical outlet) when the generator set 205 is not otherwise being used (e.g., during a break, overnight, etc.) to charge one or more power tool batteries 130 without running the engine 115 or the generator 120.

In another embodiment, the batteries 130 can include several different types of batteries, as previously described, which can be both integrated into the generator set 205 and removable from the generator set 205. As such, one type of battery that has an existing charge and is included in the batteries 130 can be used to charge another type of battery included in the batteries 130. For example, the engine 115 and the generator 120 can be used to charge a first type of battery (e.g., a sealed lead-acid battery) of the batteries 130. The first type of battery can then be used to charge a second type of battery (e.g., a removable, rechargeable power tool battery)

using the battery charger 215, but without the use of the engine 115 and the generator 120.

The generator sets 105 and 205 can also include other features. For example, in one embodiment, the generator sets 105 and 205 can include a battery charge initiator (not shown). The battery charge initiator is used to initiate a full (or otherwise defined) charge of the batteries 130 at any time, on demand. For example, a user can actuate the battery charge initiator after using the generator sets 105 and 205 to ensure that the batteries 130 are fully charged for the next use.

The generator sets 105 and 205 can also include a port that is operable to receive an input from a vehicle (e.g., a 12 volt DC port). As such, the generator set 205 may be started or "jumped" using the power from the vehicle. The port may also be adaptable to a vehicle having an inverter (e.g., a truck).

In some embodiments, the generator sets 105 and 205 also include a fuel gauge (not shown). The fuel gauge can be used to indicate the amount of fuel that is available for the engine 115, as well as the amount of energy that is stored in the batteries 130. As such, the amount of power that can be generated by the generator sets 105 and 205 (without refueling) can be determined by examining the fuel gauge.

In another embodiment, the generator sets 105 and 205 include an electric drive motor that powers wheels that are coupled to the generator sets 105 and 205. The electrically driven wheels provide greater portability by electrically assisting generator relocation efforts (e.g., a self-propelled generator set). In some embodiments, the electronic drive motor draws power from the batteries 130. Additionally, the electronic drive motor can include controls (e.g., forward, reverse, etc.) in handles of the generator set.

In another embodiment, the generator sets 105 and 205 include a controller (not shown) that controls a plurality of operations and functions of the generator sets 105 and 205. For example, in one embodiment, a controller determines the charge of the batteries 130, and, upon the batteries 130 attaining a predetermined charge (described above), shuts the engine 115 down. Additionally, the controller can start the engine 115 of the generator sets 105 and 205 if the charge of the batteries 130 drops below a predetermined threshold. Additional functions of the controller can include a battery load distribution function that balances the power drawn from the batteries 130, and an inverter bypass function that bypasses the inverter 125 for DC loads. Other controller functions are also possible.

In some embodiments, the generator sets 105 and 205 can include generator and battery systems as described in U.S. Patent Application No. 60/722,792 filed Sep. 30, 2005, and U.S. patent application Ser. No. 09/941,192 filed Aug. 28, 2001, now U.S. Pat. No. 6,806,680, both of which are incorporated herein by reference.

Other embodiments of the invention generally relate to generator systems that include an additional integrated device. In an embodiment, a generator system includes a power source (e.g., one or more electrical outlets) and an integrated pressure washer. In another embodiment, a generator system includes a power source and an integrated air compressor. Such generator systems with integrated devices can include an engine, an alternator, and a pump. As such, the engine and alternator provide a source of electricity, as well as a source of power for operating the pump. Embodiments disclosed herein can reduce the number of individual devices needed to perform multiple tasks. For example, a contractor requiring a source of power and a pressurized gas or liquid can reduce his or her individual device needs (i.e., a separate generator and pressurizing device are not needed). Additionally, embodiments disclosed herein can provide a generator system that performs multiple tasks at a relatively low cost.

Figure 3:
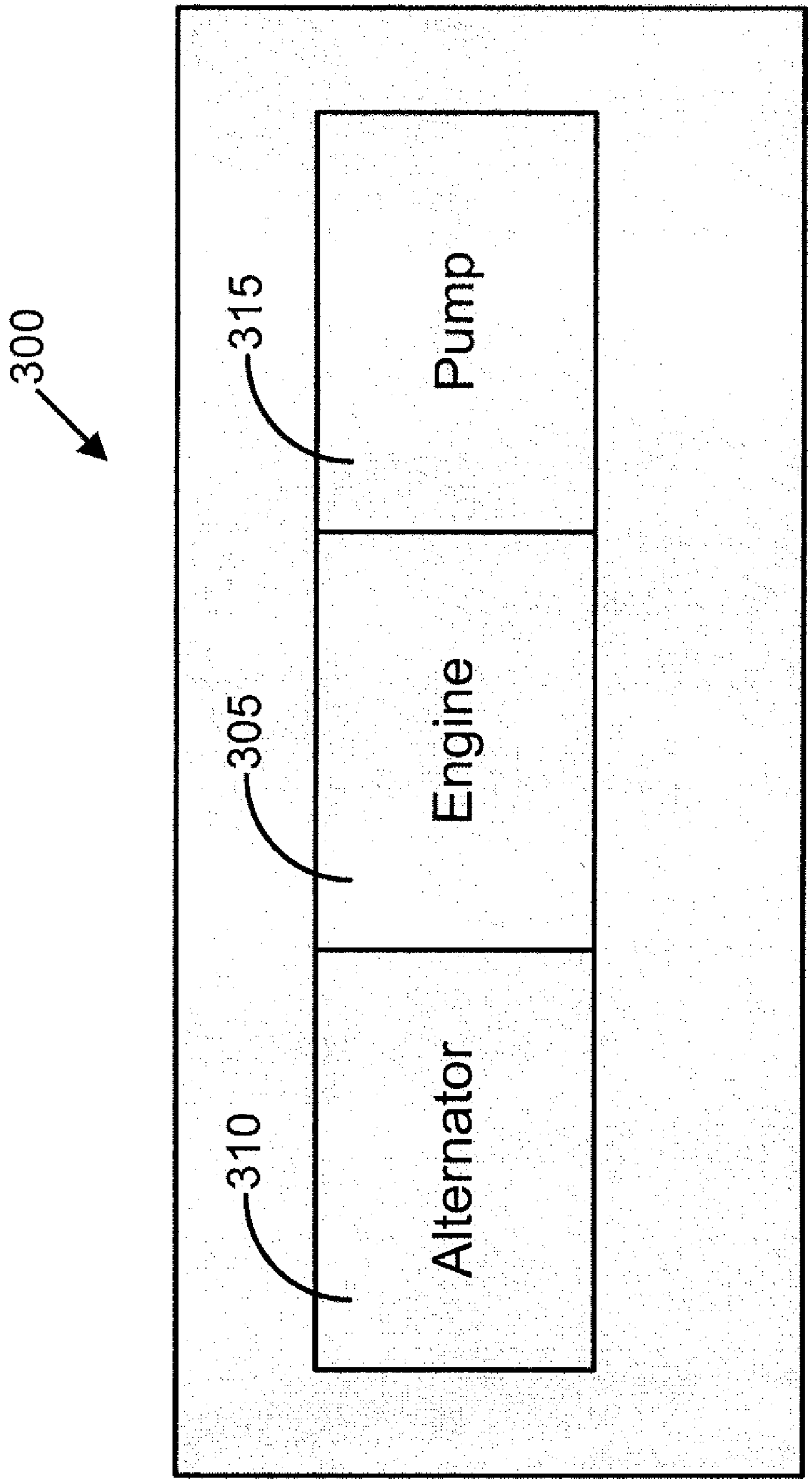
FIG. 3 illustrates a block diagram of an exemplary multifunction generator system.
Figure 4A:
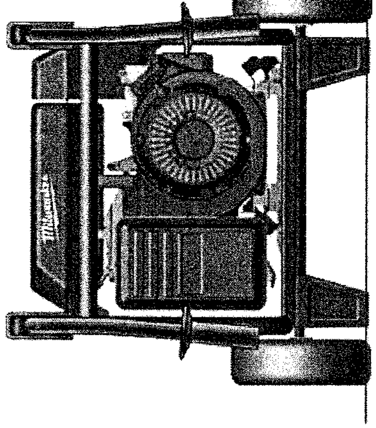
FIG. 4A illustrates a front view of a generator set according to one embodiment of the present invention.
Figure 4B:
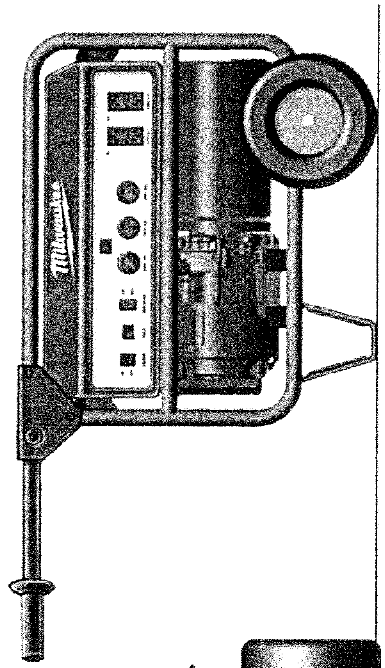
FIG. 4B illustrates a right side view of the generator set shown in FIG. 4A.
Figure 4C:
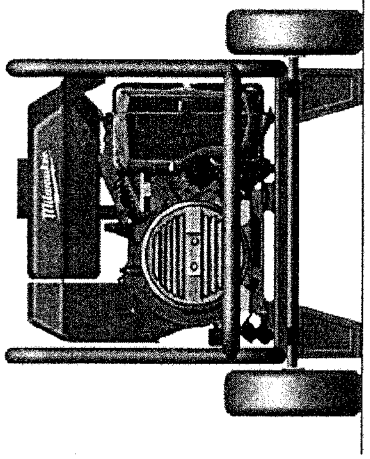
FIG. 4C illustrates a rear view of the generator set shown in FIG. 4A.
Figure 4D:
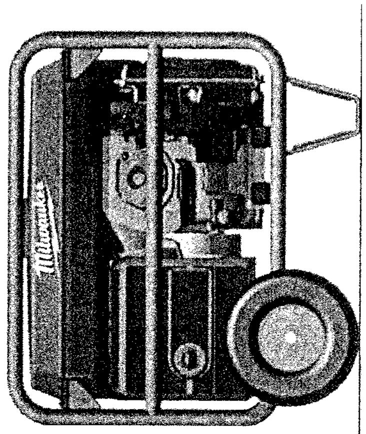
FIG. 4D illustrates a left side view of the generator set shown in FIG. 4A.

FIG. 3 illustrates a multi-function generator system 300 that includes an engine 305, an alternator 310, and a pump 315. In some embodiments, the generator system 300 is sized such that it can be moved from one location to another relatively easily. Accordingly, the generator system 300 may include one or more components (e.g., a lift hook, wheels, handles, and the like) to aid in relocating the generator system 300 that are not specifically shown in FIG. 1. In some embodiments, the generator system 300 also includes one or more tanks that can be used, for example, to separate and/or store compressed liquid and/or air.

The size and capacity of the engine 305 is variable, and depends at least partially on the size of the anticipated load (not shown) and the size and configuration of the pump 315. A relatively large load and/or a relatively large pump 315 may require a relatively large engine 305. Likewise, a smaller load and/or pump 315 require a relatively smaller engine 305. Additionally, the size of the engine 305 can depend on the desired mobility of the generator system 300. For example, the engine 305 may be sized such that the generator system 300 can be easily moved from one location to another.

The alternator 310 uses the mechanical motion that is provided by the engine 305 to produce alternating-current ("AC") electricity. Such alternators are typically known in the art. The output of the alternator 310 is at least partially dependent on the size and the operation of the engine 305. Additionally, in some embodiments, the alternator 310 can be replaced by a direct-current ("DC") source and an inverter (not shown), which in combination produce AC electricity. Such combinations are also known in the art. In other embodiments, other mechanisms (e.g., a DC source and a converter) can be implemented in place of the alternator 310.

The pump 315 is generally mechanically driven by the operation of the engine 305, as described in greater detail below. As a result, the configuration of the pump 315 is at least partially dependent on the size of the engine 305. For example, a relatively small engine 305 may not be able to operate a relatively large pump 315. The configuration of the pump 315 can also depend on the application for which the pump 315 is being used. For example, in one embodiment, the pump 315 is used to compress air for an air compressor (not shown). In such embodiment, the additional components of the air compressor can be integrated into the generator system 300. In another embodiment, the pump 315 can be used to compress a liquid such as water for a pressure washer (not shown), the components of which are also integrated into the generator system 300. In other embodiments, the pump 315 can be used to compress a variety of other gases or liquids (e.g., sealants, paints, pesticides, etc.).

The engine 305 is used to operate or provide power to both the alternator 310 (e.g., to generate electricity) and the pump 315 (e.g., to compress or pressurize liquids and/or gasses). However, in some embodiments, the engine 305 is limited to powering one function at any given time. For example, the engine 305 can provide power to either the alternator 310 or the pump 315, but not to the alternator 310 and the pump 315 concurrently. In other embodiments, the engine 305 can be configured to operate both the alternator 310 and the pump 315 concurrently.

In some embodiments, a user can select the function that is desired from the generator system 300. For example, the user may wish to charge one or more tanks of the generator system 300 with a substance (e.g., fill the tank with compressed air) using the pump 315. After the tank has been filled, the user can switch to generating electricity with the alternator 310.

When the compressed substance has been depleted, the user can switch back to operating the pump 315. Such switching functionality can be implemented, for example, with a selector switch or similar device.

In some embodiments, components of the generator system 300 can be used to carry out multiple tasks. For example, in one embodiment, a fan of the engine 305 is used to cool the engine 305 as well as provide a source of air for one or more tanks (e.g., an air holding tank). Other components of the generator system 300 may also be used for several functions.

FIGS. 4A-4D illustrate a generator set 400 according to an embodiment of the invention. In some embodiments, the generator set 400 can incorporate, for example, the concepts described with respect to FIGS. 1-3.

The embodiments described herein set forth certain example embodiments of the invention. All possible embodiments of the invention are not set forth, and the examples provided should in no way be construed as limiting of the invention.

The invention claimed is:

1. A generator set comprising:

an internal combustion engine;

a DC generator coupled to the engine and configured to produce direct current ("DC") electricity;

one or more battery cells configured to discharge stored DC electricity, the one or more battery cells operable to be recharged using DC electricity from the DC generator, wherein the one or more battery cells include a first group of battery cells and a second group of battery cells, wherein the first group of battery cells and the second group of battery cells are independently rechargeable, and wherein the first group of battery cells are configured to be relatively permanently integrated within the generator set and the second group of battery cells are configured to be removable from the generator set and compatible with a portable power tool; and an inverter electrically connected to the DC generator and to the one or more battery cells, the inverter configured to convert DC electricity produced by the DC generator and DC electricity discharged from the one or more battery cells to alternating current ("AC") electricity, the AC electricity available for use by a load.

2. The generator set of claim 1, further comprising a charge indicator configured to provide an indication of an amount of stored DC electricity that is available to be discharged by the one or more battery cells.

3. The generator set of claim 1, further comprising a charge limiter configured to limit recharging of the one or more battery cells upon the one or more battery cells reaching a predetermined stored energy threshold.

4. The generator set of claim 1, wherein the one or more battery cells are lithium ion cells.

5. The generator set of claim 1, wherein the first group of battery cells can be recharged using DC electricity from the DC generator independently of the second group of battery cells, and the second group of battery cells can be recharged using DC electricity from the DC generator independently of the first group of battery cells.

6. The generator set of claim 1, further comprising a charge initiator configured to initiate a recharging of the one or more battery cells, wherein the charge initiator is actuatable by a user.

7. The generator set of claim 1, wherein the inverter is configured to convert the DC electricity from the one or more battery cells prior to converting the DC electricity from the DC generator.

8. The generator set of claim 1, wherein the DC generator is configured to supply a first portion of DC electricity to the inverter and a second portion of DC electricity to the one or more battery cells.

9. The generator set of claim 8, wherein, when a load is connected to the inverter, the first portion of the DC electricity from the DC generator is determined by the load, and the second portion of the DC electricity from the DC generator is determined by remaining available DC electricity from the generator.

* * * * *